United States Patent
Martin et al.

(10) Patent No.: US 6,553,789 B1
(45) Date of Patent: Apr. 29, 2003

(54) QUARTZ GLASS PLATES WITH HIGH REFRACTIVE INDEX HOMOGENEITY

(75) Inventors: Rolf Martin, Jena (DE); Andreas Menzel, Jena (DE); Frank Coriand, Jena (DE); Wolfgang Schmidt, Jena (DE)

(73) Assignee: Schott Glass, Mainz (DE)

( * ) Notice: Subject to any disclaimer, the term of this patent is extended or adjusted under 35 U.S.C. 154(b) by 0 days.

(21) Appl. No.: 09/830,808

(22) PCT Filed: Oct. 14, 1999

(86) PCT No.: PCT/EP99/08136

§ 371 (c)(1),
(2), (4) Date: Apr. 27, 2001

(87) PCT Pub. No.: WO00/24684

PCT Pub. Date: May 4, 2000

(30) Foreign Application Priority Data

Oct. 28, 1998 (DE) .......................... 198 50 265

(51) Int. Cl.[7] ............................... C03B 23/04
(52) U.S. Cl. ............... 65/67; 65/404; 65/433; 65/439
(58) Field of Search ................. 65/433, 67, 386, 65/404, 439

(56) References Cited

U.S. PATENT DOCUMENTS

| | | | | |
|---|---|---|---|---|
| 3,823,995 A | * | 7/1974 | Carpenter | |
| 5,785,729 A | * | 7/1998 | Yokokawa et al. | ........... 65/385 |
| 6,415,630 B1 | * | 7/2002 | Coriand et al. | ................ 65/57 |

FOREIGN PATENT DOCUMENTS

| | | |
|---|---|---|
| DE | 3226451 A1 | 1/1984 |
| DE | 4203287 C2 | 8/1993 |
| EP | 0673888 A1 | 9/1995 |

\* cited by examiner

*Primary Examiner*—James Derrington
(74) *Attorney, Agent, or Firm*—Jordan and Hamburg LLP

(57) ABSTRACT

A method produces homogenous quartz glass plates without streaks. The method is applied to starting quartz glass body which has an X—X geometrical axis and good refractive index homogeneity in its central area, and a refractive index homogeneity decreasing as the axis lies further from a central area. The body is divided into at least two concave parts by longitudinal cuts parallel to the axis once the central area has been processed out of the body. The parts are placed separately in corresponding molds and heated therein such that they are molded to form quartz glass plates having a desired thickness.

12 Claims, 1 Drawing Sheet

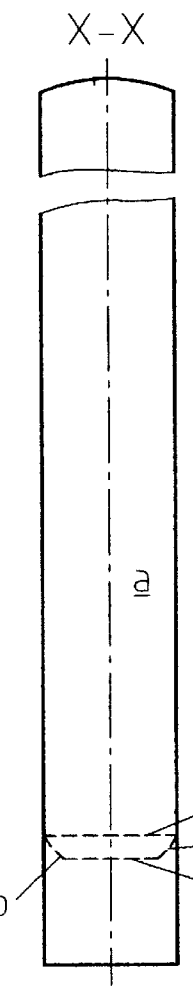
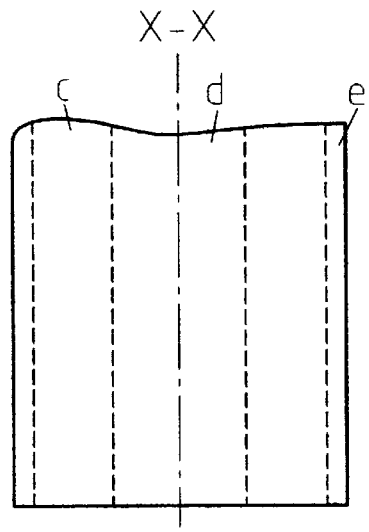
Fig. 2
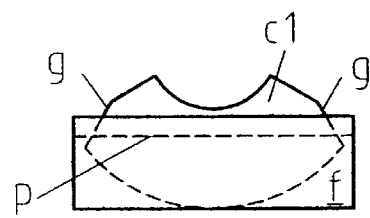
Fig. 4
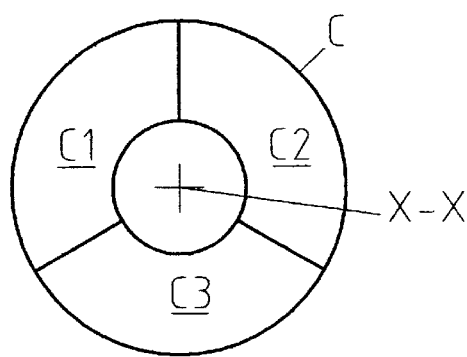
Fig. 1
Fig. 3
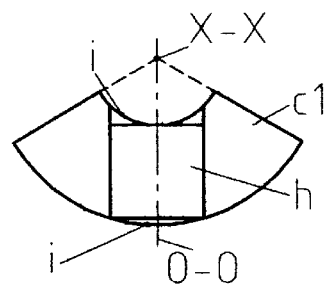
Fig. 5

QUARTZ GLASS PLATES WITH HIGH REFRACTIVE INDEX HOMOGENEITY

BACKGROUND OF THE INVENTION

The invention relates to a method for producing quartz glass plates of a high refractive index homogeneity according to the kind of the patent claims.

As generally known, and in order to produce homogeneous streak-free quartz glass plates, quartz glass rods are molten and these are thermally transformed to yield the desired plate-shape. If necessary, and before the thermal transformation, the external (cladding) layer of a quartz glass rod of too low a refractive index homogeneity has to be worked off. The manufacture of quartz glass rods can be realized, for example, according to DE 32 26 451 and DE 42 03 287. Such a quartz glass rod has refractive index homogeneities which are better than $2 \times 10^{-6}$ in axial direction and in direction of the circumference, and better than $2 \times 10^{-5}$ in radial direction after working off of rim portions of the rod.

Therefore, only a certain core range of the quartz glass rod can be utilized for highly precise rotation symmetrical optical parts, which core range will mostly have been bored out by using a hollow diamond drill. Thereby, an outer annular cylinder remains as not being utilized. Up to now, such an annular cylinder was used for parts which, for example, only require a low optical homogeneity, if any.

In the manufacture of quartz glass plates, it very often does not depend on the rotation symmetrical arrangement of and the keeping to the homogeneities, but it rather depends on the keeping to the homogeneity per se, which is axially given for sure with $\leq 2 \times 10^{-6}$ for the initial quartz glass rod.

SUMMARY OF THE INVENTION

It is an object of the present invention to provide a method which utilizes cylindrical rings or similar ones in the manufacture of optical components of high refractive index homogeneities from quartz glass rods.

According to the invention the object is realized by a method for producing quartz glass plates of high refractive index homogeneities from a cylindrical quartz glass body having a high refractive index homogeneity along its geometrical axis and in circumferential direction, and a variable refractive index curve at least opproximately in rotational symmetry to a cylinder axis X—X, comprising cutting out an interior portion of the cylindrical quartz glass body to form a ring shaped body, separating the ring shaped body into at least two concave parts along separation cuts substantially parallel to the axis X—X, separately inserting the at at least two concave parts into corresponding moulds, and heating the at least two concave parts in the moulds such that the at least two concave parts are respectively transformed into quartz glass plates of a desired thickness.

Advantageously, the streak-free initial quartz glass body is a cylindrical rod which preferably is separated into concave parts by concentric longitudinal sections after, if required, its outer layer has been worked off, for example, by abrasion. Basically and according to the invention an interior, preferably rotation symmetrical range of a high, however, at least of a sufficient refractive index homogeneity is cut out of the quartz glass body, whereby said range extends in direction of and in parallel to the axis X—X. The remaining body resulting therefrom, which preferably is a cylindrical ring, is longitudinally separated in at least two, preferably in three parts (segments), each of said parts is given into a respective mould and heated in such a way that it is transformed to a quartz glass plate of a desired thickness in said mould. Before the concave shaped parts are inserted into the mould, the radial extending limiting areas are preferably reduced in such a manner that the interior circumference is related to the external circumference at a ratio of 1 to 1.4 . . . 1.6 to each other. In other words: the interior circumference has to be multiplied by 1.4 to 1.6 to obtain the external circumference. The thickness of the transformed plate shall not substantially depart, if possible, from the radially extending thickness of the concave-shaped parts, on which it is based. The segments are placed into the mould in such a way that their curved outer faces, which are the original outer faces of the cylindrical ring, are the top side and the bottom side, respectively, of the transformed plate. It turned out as advantageous, when the length and the width of the mould with respect to its inner dimensions are adapted to the concave-shaped part in such a way that the external circumference of the concave-shaped part plus 2 mm will yield the width of the mould, and the length of the concave-shaped part plus 2 mm will yield the length of the mould. The optical axis O—O of the respective partial body, that is the direction in which it will be optically used, is at least substantially at right angles to the axis X—X of the original quartz glass body. Thus, it will be possible to manufacture plates with a refractive index homogeneity at right angles to the optical axis O—O of $2 \times 10^{-6}$ and better. Thereby the diameter and the height of the original quartz glass body, which can be intentionally manufactured by application of different manufacturing and forming technologies, also determine the dimensions of the quartz glass plate to be manufactured according to the invention, out of which, if required, a range of a sufficient refractive index homogeneity can be cut out. Within the scope of the invention there are further possibilities:

the manufacture of more than three segments out of one quartz glass ring;

the working-out of optical elements out of one quartz glass rod or out of at least one of the segments, the optical axis/axes of which (effective direction) is/are directed at right angles to the axis of the original quartz glass body.

DETAILED DESCRIPTION OF THE INVENTION

In the following, the invention will be explained in more detail in the schematical drawings by virtue of two embodiments. There is shown in:

FIG. 1 a lateral view of an original quartz glass body;

FIG. 2 a lateral view of a drilled-out glass rod;

FIG. 3 a plan view of the drilled-out glass rod according to FIG. 2;

FIG. 4 a segment inserted into a mould; and

FIG. 5 the working-out of an optical element out of a segment.

DESCRIPTION OF THE PREFERRED EMBODIMENTS

In FIG. 1 a quartz glass body, namely a quartz glass rod a is represented having a geometrical axis X—X into which the refractive index course is plotted as a dashed line b across a diameter q. In the present case, the refractive index course is in rotation symmetry about the axis X—X across the cross-section. Starting from and in contrast to a central plane range or substantially plane range b1 which, due to the manufacturing process, exhibits a uniformly low refractive index variation, if any, the refractive index in an external range b2 rises parabolically.

In FIG. 2 the quartz glass rod of FIG. 1 has been thermally transformed into a starting quartz glass body c which has, compared to FIG. 1, a non-varied homogeneity curve and the central range d of said starting quartz glass body which is rotation symmetrical to the axis X—X, can be cut out by means of a hollow drill and the peripheral cladding range e can be turned off or ground off.

In FIG. 3 the part d (FIG. 2) having a favorable homegeneity and the part e (FIG. 2) having a very unfavorable homogeneity have been removed and the remaining quartz glass body c is separated into three equal parts c1, c2, and c3, each of which being part of a cylindrical ring.

In FIG. 4 a cylindrical ring segment, for example, c1, which has broken edges g that extend at right angles to the drawing plane respectively in parallel to the cladding lines of the cylindrical ring, is inserted into a mould f. In said mould f the cylindrical ring segment is transformed into the plate p (indicated by the dashed line parallel to the bottom of the mould), the refractive index homogeneity of which at right angles to the optical axis O—O is good, what corresponds to the axial refractive index curve and to the refractive index curve in the direction of the circumference in the rod a, however, it is not rotation symmetrical.

In FIG. 5, again a segment c1 is shown, out of which an optically effective component h with an optical axis O—O at right angles to the axis X—X is separated. The axis X—X itself is directed at right angles to the drawing plane. Depending on a further application design of this component it is advantageous to work off the curved areas i to yield plane ones.

By virtue of the invention cylindrical parts and cylindrical annular parts, respectively, of a given refractive index distribution, which can only poorly optically utilized, are turned into high quality optical plates, the refractive index homogeneities of which are, according to the above described, determined by the homogeneity of the original parts. In particular the mostly good homogeneity of the original parts will be utilized in axial and peripheral directions in order to obtain the very often required good homogeneity of the produced plates.

All features disclosed in the specification, in the subsequent claims, and in the drawing can be substantial for the invention both, individually and in any combination with one another.

LIST OF REFERENCE NUMERALS a starting quartz glass body, quartz glass rod
b line (refractive index homogeneities curve)
b1 plane range
b2 external range (parabolically),
c quartz glass body
c1, c2, c3 parts of a cylindrical ring
d central range
e peripheral cladding range
f mould
g broken edges
h component
i curved areas
p plate
q diameter
O—O optical axis
X—X geometrical axis

What is claimed is:
1. A method for producing quartz glass plates of high refractive index homogeneities from a cylindrical quartz glass body having a high refractive index homogeneity along its geometrical axis and in circumferential direction, and a variable refractive index curve at least approximately in rotational symmetry to a cylinder axis X—X, comprising:
   cutting out an interior portion of said cylindrical quartz glass body to form a ring shaped body;
   separating the ring shaped body into at least two concave parts along separation cuts substantially parallel to the axis X—X;
   separately inserting said at least two concave parts into corresponding moulds; and
   heating said at least two concave parts in said moulds such that said at least two concave parts are respectively transformed into quartz glass plates of a desired thickness.

2. Method as claimed in claim 1, wherein the separation cuts are angled to defines planes intersecting the axis X—X.

3. Method as claimed in claim 1 or 2, wherein a peripheral portion of the cylindrical quartz body extending in direction of the axis X—X is removed before separating to yield the ring shaped body which is separated into the at least two concave parts.

4. Method as claimed in claim 3, wherein said interior portion of the quartz glass body is cut out by a hollow drill before said separation of the ring shaped body into said concave parts.

5. Method as claimed in claim 1 or 2, wherein outer edges, extending in parallel to the axis X—X, of the concave parts are cut off before inserting said concave parts into the moulds.

6. Method as claimed in claim 1, further comprising forming optical components from said concave parts, wherein each of said optical components has an optical axis O—O directed at least substantially at right angles to the axis X—X.

7. The method as claimed in claim 3, wherein outer edges, extending in parallel to the axis X—X, of the concave parts are cut off before inserting said concave parts into the moulds.

8. The method as claimed in claim 7, further comprising forming optical components from said concave parts, wherein each of said optical components has an optical axis O—O directed at least substantially at right angles to the axis X—X.

9. The method as claimed in claim 3, further comprising forming optical components from said concave parts, wherein each of said optical components has an optical axis O—O directed at least substantially at right angles to the axis X—X.

10. The method as claimed in claim 4, wherein outer edges, extending in parallel to the axis X—X, of the concave parts are cut off before inserting said concave parts into the moulds.

11. The method as claimed in claim 10, further comprising forming optical components from said concave parts, wherein each of said optical components has an optical axis O—O directed at least substantially at right angles to the axis X—X.

12. The method as claimed in claim 7, further comprising forming optical components from said concave parts, wherein each of said optical components has an optical axis O—O directed at least substantially at right angles to the axis X—X.

* * * * *